United States Patent
Zhu et al.

(10) Patent No.: US 10,659,935 B1
(45) Date of Patent: May 19, 2020

(54) COLLECTIVE OBJECTS MANAGEMENT SYSTEM WITH RECEPTACLE FOR RANDOM DEPOSIT OF ADDRESSABLE OBJECTS

(71) Applicants: Shengbo Zhu, San Jose, CA (US); Su Shiong Huang, Belleville, WA (US)

(72) Inventors: Shengbo Zhu, San Jose, CA (US); Su Shiong Huang, Belleville, WA (US)

(73) Assignee: iMicrodata CORPORATION, San Jose, CA (US)

( * ) Notice: Subject to any disclaimer, the term of this patent is extended or adjusted under 35 U.S.C. 154(b) by 0 days.

(21) Appl. No.: 16/501,708

(22) Filed: May 24, 2019

(51) Int. Cl.
*H04W 4/35* (2018.01)
*H02J 50/20* (2016.01)
*H04W 4/80* (2018.01)
*H02J 7/02* (2016.01)
*G08B 5/36* (2006.01)

(52) U.S. Cl.
CPC ............... *H04W 4/35* (2018.02); *G08B 5/36* (2013.01); *H02J 7/025* (2013.01); *H02J 7/027* (2013.01); *H02J 50/20* (2016.02); *H04W 4/80* (2018.02)

(58) Field of Classification Search
CPC . H04W 4/35; H04W 4/80; H02J 50/20; H02J 7/025; H02J 7/027; G08B 5/36
See application file for complete search history.

(56) References Cited

U.S. PATENT DOCUMENTS

| | | | | |
|---|---|---|---|---|
| 8,471,717 B2 * | 6/2013 | Zhu | ...................... | G06Q 10/087 340/540 |
| 9,475,612 B2 * | 10/2016 | Zhu | ...................... | B42F 15/0094 |
| 9,875,460 B2 * | 1/2018 | Zhu | ...................... | G08B 13/149 |
| 9,941,730 B1 * | 4/2018 | Kim | ...................... | H02J 50/20 |
| 10,102,698 B2 * | 10/2018 | Zhu | ...................... | G07C 9/00309 |
| 2006/0072302 A1 * | 4/2006 | Chien | ................ | F21V 33/0024 362/84 |
| 2014/0154976 A1 * | 6/2014 | Terwilliger | ............ | H04W 4/80 455/41.1 |
| 2018/0153639 A1 * | 6/2018 | Wehrle | ............... | G06K 7/10188 |

* cited by examiner

*Primary Examiner* — Thomas D Alunkal

(57) ABSTRACT

A collective objects management system using addressable object tracking devices attached to objects without the need for specially constructed cabinets having mounting pegs or locking apertures. Receptacles are slidably stored in ordinary cabinet cavities. Each receptacle has a first Bluetooth® antenna mounted on an outside wall surface and a second Bluetooth® antenna mounted on an inside wall surface. Each antenna communicates with a supervisory MCU via a separate Bluetooth® unit. An electronic lock and a visible indicator mounted on the receptacle front wall are controlled by the MCU. The MCU communicates with an outside host requesting device via the first antenna, and communicates with any object tracking devices in the receptacle via the second antenna. The object tracking devices have a battery and a battery management components which are powered by a transmitting array located in the receptacle.

19 Claims, 9 Drawing Sheets

COLLECTIVE OBJECTS MANAGEMENT SYSTEM WITH RECEPTACLE FOR RANDOM DEPOSIT OF ADDRESSABLE OBJECTS

BACKGROUND OF THE INVENTION

This invention relates to collective objects management systems in general, and in particular to an improved collective objects management system using object identification with digital addresses. More particularly, this invention relates to an improvement for a collective objects management system using object identification with digital addresses, the improvement pertaining to a receptacle for random deposit of addressable objects.

The term "collective objects management systems" is a term coined to denote systems for generally keeping track of items ("objects") in a collection of items. For example, an automobile parts warehouse at any given time has a collection of vehicle parts ("objects") in inventory. The kind and number of such parts varies every day, as parts are sold and new parts are received. In order to keep track of the number and kind of vehicle parts in inventory, some type of collective vehicle parts management system must be used. Similarly, in a semiconductor manufacturing operation, at any given time there is a collection of integrated circuits ("objects") of one or more types located somewhere in the facility, which must be accounted for using a collective integrated circuits management system. In supermarkets, a collection of a large number of different types of items, such as meats, produce, canned goods and the like is usually in inventory, with the number and types of objects varying widely on a daily basis and thus requiring a complex objects management system. In business offices and some homes, file storage cabinets are typically used to store documents used for both business and personal activities. A typical file storage cabinet has several pull-out drawers each containing a relatively large number of file folders ("objects"), with each folder containing one or more documents. In order to enable the documents contained in the various files to be readily accessed and inventoried, some type of file management system is necessary.

Commonly assigned U.S. Pat. No. 8,471,717 issued Jun. 25, 2013 for "Collective Objects Management System With Object Identification Using Addressable Decoder Units" discloses a system for managing objects distributed in an object location space. The disclosure of the '717 patent is hereby incorporated by reference. The '717 system enables efficient management of a collection of objects by associating an address decoder circuit with each object in the collection, with each address decoder being accessible by a system user via a host computer. This technique provides objects management capability for objects distributed in an object location space which is superior to older, manual techniques implemented in the past.

Commonly assigned U.S. Pat. No. 9,875,460 for "Removably Suspended Electronically Addressable Object And System" issued Jan. 23, 2018, the disclosure of which is hereby incorporated by reference, discloses an electronically addressable removably suspendable object carrier and a system for management of objects carried thereby which extends the advantages afforded by the electronically addressable collective objects management system described above with reference to the '717 patent to the class of removably suspendable objects. The invention of the '460 patent comprises an electronically addressable object carrier for enabling the management of objects distributed in an object location space, the object carrier comprising a housing having an object retention element for securing an object to the object carrier and at least one through aperture for removably receiving an electrically conductive suspension member capable of manifesting object address signals and power signals supplied by a source; a microcontroller carried by the housing, the microcontroller having a unique object address serving to identify an object secured to the object carrier; an electrically conductive element located in the at least one aperture for electrically coupling the microcontroller to the electrically conductive suspension member when the aperture is removably received on the electrically conductive suspension member; and an indicator coupled to the microcontroller for activation whenever the microcontroller receives an address signal representative of the unique object address. The indicator is a visible indicator, preferably an LED light source. The object carrier may also include an additional indicator coupled to the microcontroller for activation whenever the microcontroller receives power signals.

In use, the devices according to the '460 invention are removably suspended by a plurality of electrically conductive suspension members capable of manifesting object address signals and power signals supplied by a source, the suspension members being secured to a support element, such as the back board of a cabinet. A user can locate an individual object registered in the system by merely entering the identification of the sought object into a host computer, observing the activated visible indicator on the object carrier associated to the object, and manually removing the object carrier from the suspension member.

While the '460 system greatly improves management of the removably suspended objects registered in the system, the integrity of the collection of objects is susceptible to unauthorized removal of the object carriers from the suspension members. In particular, any object carrier can be removed from its suspension member once access to the storage cabinet is achieved. Consequently, a user with access to the system can remove not only the sought object but also all other objects stored in the cabinet. This compromised integrity of the collection of objects is less than desirable.

Commonly assigned U.S. Pat. No. 10,102,698 issued Oct. 16, 2018, the disclosure of which is hereby incorporated by reference, discloses a solution which cures the disadvantages inherent in the '460 system. Specifically, the '698 system employs a combination of a specially designed lockable cabinet having a plurality of receiving apertures formed in an intermediate partition and companion object holders having a geometry conformable with the partition apertures so that they can be inserted and removed from the apertures. A plurality of solenoid locks are positioned adjacent to the partition apertures and are engageable with a locking notch formed in the object holders so that an object holder, once inserted into a partition aperture, cannot be removed until the solenoid is operated to unlock a given object holder.

Both the 460 system and the '698 system have been found to be effective in providing collective object management in a variety of applications. However, in some applications the typical users find the requirement to carefully install the object holders on suspension members or in receiving apertures to be inconvenient at best and bothersome at worst. This is particularly true for systems which are designed for use by salesmen with a collection of automobile keys in a auto dealership. In addition, both systems require specially constructed storage cabinets which increases the cost of the system.

SUMMARY OF THE INVENTION

The invention comprises an improvement to the '460 and '698 systems which retains the advantages of addressable object holders in a collective objects management system but eliminates the need for specially constructed cabinets of the '460 and '698 types and which provides for random deposit of the object holders in a conventional receptacle-such as a locking drawer-, thereby eliminating the need for users to carefully manipulate the object holders onto suspension members or into receiving apertures In a broadest aspect the invention comprises a receptacle for removably containing addressable object tracking devices attached to objects and having a battery and battery management components, the receptacle comprising:

a structure having a bottom wall, an upstanding front wall, an upstanding rear wall and two opposed upstanding side walls forming an enclosure open at the top thereof;

a first Bluetooth® antenna secured to an outside surface of one of the walls;

a second Bluetooth antenna secured to an inside surface of one of the walls;

an MCU positioned within the enclosure;

a first Bluetooth® unit coupled between the first Bluetooth® antenna and the MCU for providing bidirectional communication therebetween;

a second Bluetooth® unit coupled between the second Bluetooth® antenna and the MCU for providing bidirectional communication therebetween; and a transmitting antenna array for supplying externally generated electrical power to the battery management components of object tracking devices located in the enclosure. The first and second Bluetooth® antenna are preferably secured to the same wall of the receptacle, with the rear wall being the preferred same wall.

The receptacle further preferably includes an electronic lock coupled to the MCU and controllable thereby to provide a releasable locking function for the receptacle.

The receptacle further preferably further includes a light source attached to the front wall of the receptacle, the light source being coupled to the MCU and controllable thereby to provide a visible indication of the state of the receptacle.

The receptacle further includes a memory unit coupled to the MCU for storing information indicative of the contents of the receptacle, the information including the identification of any object tracking devices located in the enclosure.

The transmitting antenna array preferably comprises a support surface and a plurality of multi-turn essentially planar coils carried by the support surface and arranged in a mutually spaced array of at least two rows with coils in one row laterally spaced with respect to coils in another row. Each coil has a length dimension; and the coils in a given row are mutually spaced by an amount substantially equal to one-half the length dimension; and the coils in one row are laterally spaced with respect to the coils in another row by an amount substantially equal to one-fourth the length dimension.

In a system aspect, the invention comprises a system for managing objects distributed in an object location space, the objects being attached to addressable object tracking devices having a battery and battery management components the system including:

a cabinet having one or more cavities for slidably receiving drawer-like receptacles; and one or more receptacles slidably received in the one or more cavities for removably containing the addressable object tracking devices, each receptacle comprising:

a structure having a bottom wall, an upstanding front wall, an upstanding rear wall and two opposed upstanding side walls forming an enclosure open at the top thereof;

a first Bluetooth® antenna secured to an outside surface of one of the walls;

a second Bluetooth antenna secured to an inside surface of one of the walls;

an MCU positioned within the enclosure;

a first Bluetooth® unit coupled between the first Bluetooth® antenna and the MCU for providing bidirectional communication therebetween;

a second Bluetooth® unit coupled between the second Bluetooth® antenna and the MCU for providing bidirectional communication therebetween; and a transmitting antenna array for supplying externally generated electrical power to the battery management components of object tracking devices located in the enclosure.

The first and second Bluetooth® antennas are preferably secured to the same wall of the receptacle, with the rear wall being preferred.

Each receptacle further includes an electronic lock coupled to the MCU and controllable thereby to provide a releasable locking function for the receptacle in its cavity.

Each receptacle further includes a light source attached to the front wall thereof, the light source being coupled to the MCU and controllable thereby to provide a visible indication of the state of the receptacle.

Each receptacle further includes a memory unit coupled to the MCU for storing information indicative of the contents of the receptacle, the information including the identification of any object tracking devices located in the enclosure.

The transmitting antenna array preferably comprises a support surface and a plurality of multi-turn essentially planar coils carried by the support surface and arranged in a mutually spaced array of at least two rows with coils in one row laterally spaced with respect to coils in another row. Each coil has a length dimension; and the coils in a given row are mutually spaced by an amount substantially equal to one-half the length dimension; and the coils in one row are laterally spaced with respect to the coils in another row by an amount substantially equal to one-fourth the length dimension.

The invention eliminates the need for specially constructed cabinets of the '460 and '698 types and enables the random deposit of the object holders in a conventional receptacle-such as a locking drawer—thereby eliminating the need for users to carefully manipulate the object holders onto suspension members or into receiving apertures in such specially constructed cabinets while preserving the advantages of addressable object holders in a collective objects management system For a fuller understanding of the nature and advantages of the invention, reference should be made to the ensuing detailed description taken in conjunction with the accompanying drawings.

DETAILED DESCRIPTION OF THE PREFERRED EMBODIMENTS

The invention has wide application to a large variety of electronically addressable objects. The following is a detailed description of one application of the invention to objects which are keys attached to object carriers which function as key holders.

Figure 1:
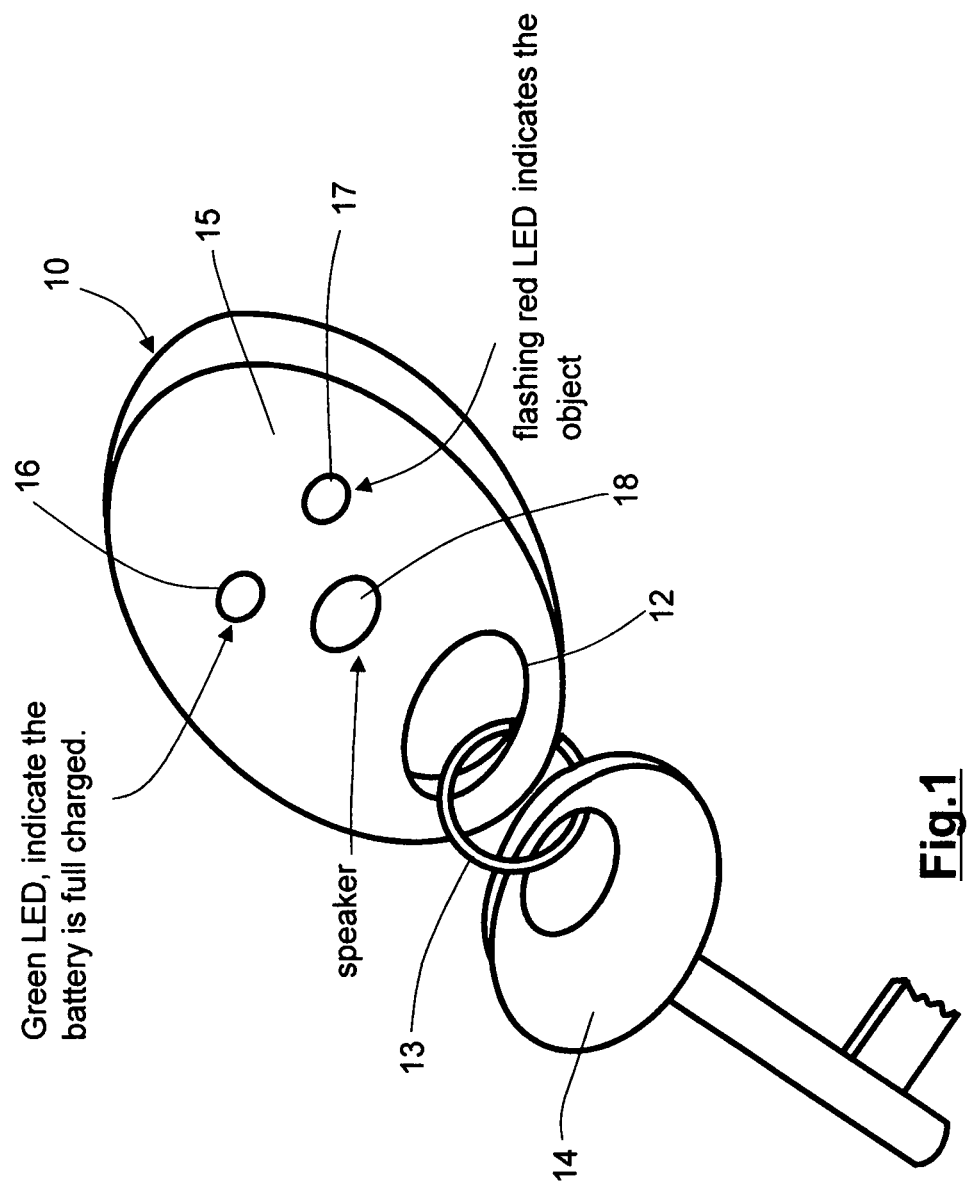
FIG. 1 is a perspective view of an object tracking device in the form of a key and a key holder object carrier for use with the invention.

Turning now to the drawings, FIG. 1 is a perspective view of an object tracking device in the form of a key holder object carrier for use with the invention. As seen in this Fig., an addressable key holder object carrier generally designated with reference numeral 10 has a housing as illustrated with a through aperture 12 for receiving a retaining ring 13 to which a key 14 is attached. Formed in one surface 15 of housing 10 are three apertures 16-18. Apertures 16, 17 accommodate two illumination sources, preferably LEDs, which are mounted inside housing 10 and provide separate indications of the charging state of a battery mounted internally of housing 10 and the active state of the object tracking device, when activated by the internal electronics shown in FIG. 2. Preferably the two illumination sources positioned in apertures 16, 17 produce lighting of different colors, such as green for the source in aperture 16 and flashing red for the source in aperture 17. Other colors may be selected, depending on the preferences of the designer. Aperture 18 accommodates an audio source driven by the electronic components located internally of object carrier 10 in the manner described below.

Figure 2:
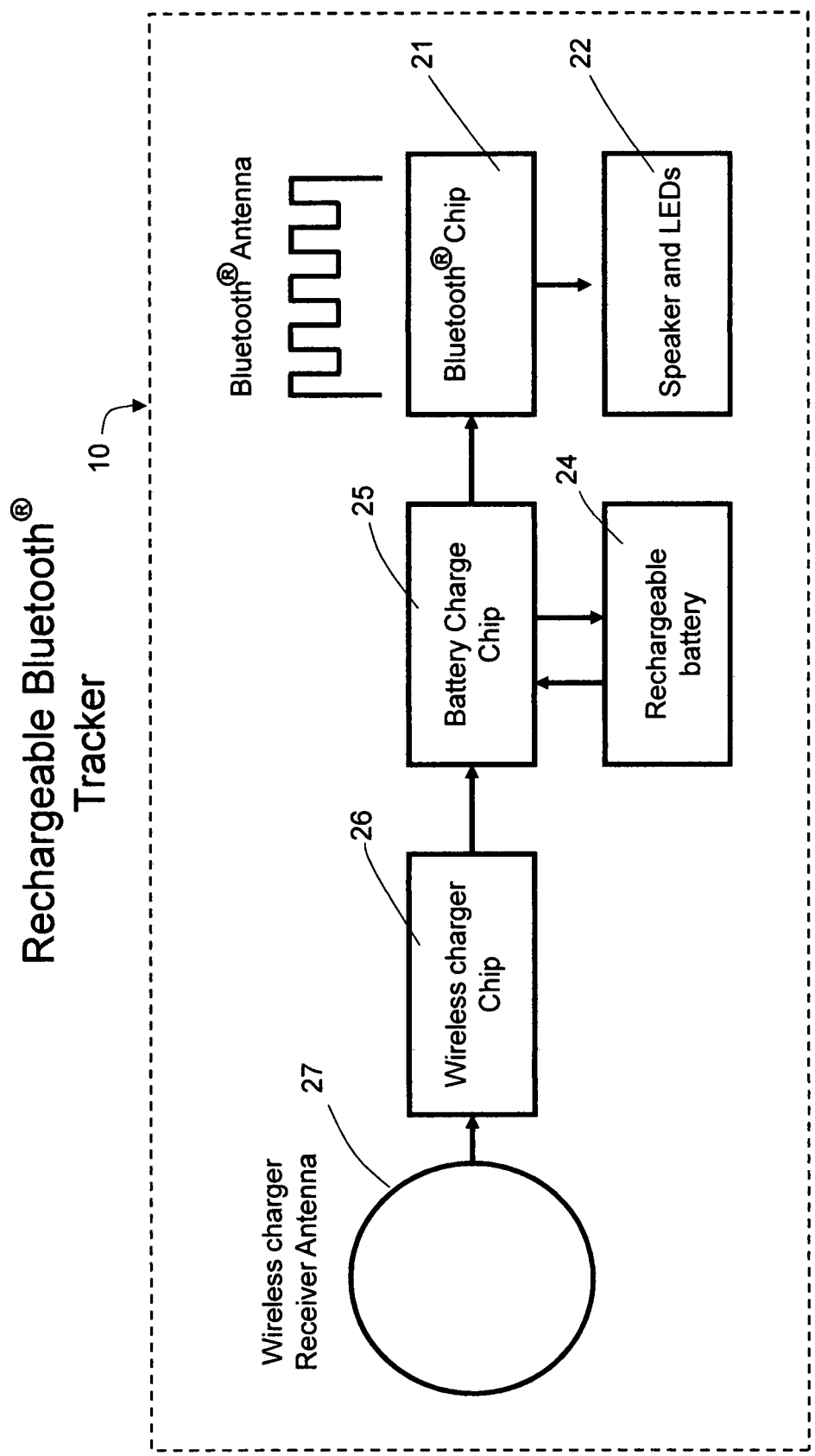
FIG. 2. Is a schematic block diagram of the principal electronic components of each key holder object carrier according to the invention

FIG. 2 Is a schematic block diagram of the principal electronic components located in the interior of the housing of object carrier 10. In this Fig., the perimeter of the housing is schematically depicted by the rectangular broken lines. As seen in this Fig., a conventional Bluetooth® chip 21, which incorporates an antenna, has outputs which are coupled to two LEDs and the audio source noted above and designated generally with reference numeral 22. When the chip 21 is addressed by an external requesting device in the manner described below, a signal is generated by chip 21 which causes the LED associated to aperture 17 to flash to provide a visible indication that the object tracking device is the one being sought. In addition, chip 21 generates a signal to cause the audio source to emit a sound to provide an audible indication that the object tracking device is the one being sought. Chip 21 includes a memory portion which stores a unique identification character serving to uniquely identify the object tracking device 10 in which that chip 21 is located. Chip 21 is preferably a type CC2541 chip available from Texas Instruments of Dallas, Tex. Also included within the interior of the housing of object carrier 10 is a rechargeable battery 24 for providing electrical power to the electrical components, a battery charge chip 25 for managing the amount of charge stored in battery 24, and a wireless charger chip 26, which receives power from an outside source described below via a wireless charger antenna 27 and supplies this power to battery charge chip 25. Battery charge chip 25 is preferably a type TP4057 unit available from Lite-on, Inc. of Milpitas, Calif. Wireless changer chip 26 is preferably a type STWBC unit available from ST, Inc. of Geneva, Switzerland. Wireless charger antenna 27 is a simple loop antenna.

Figure 3:
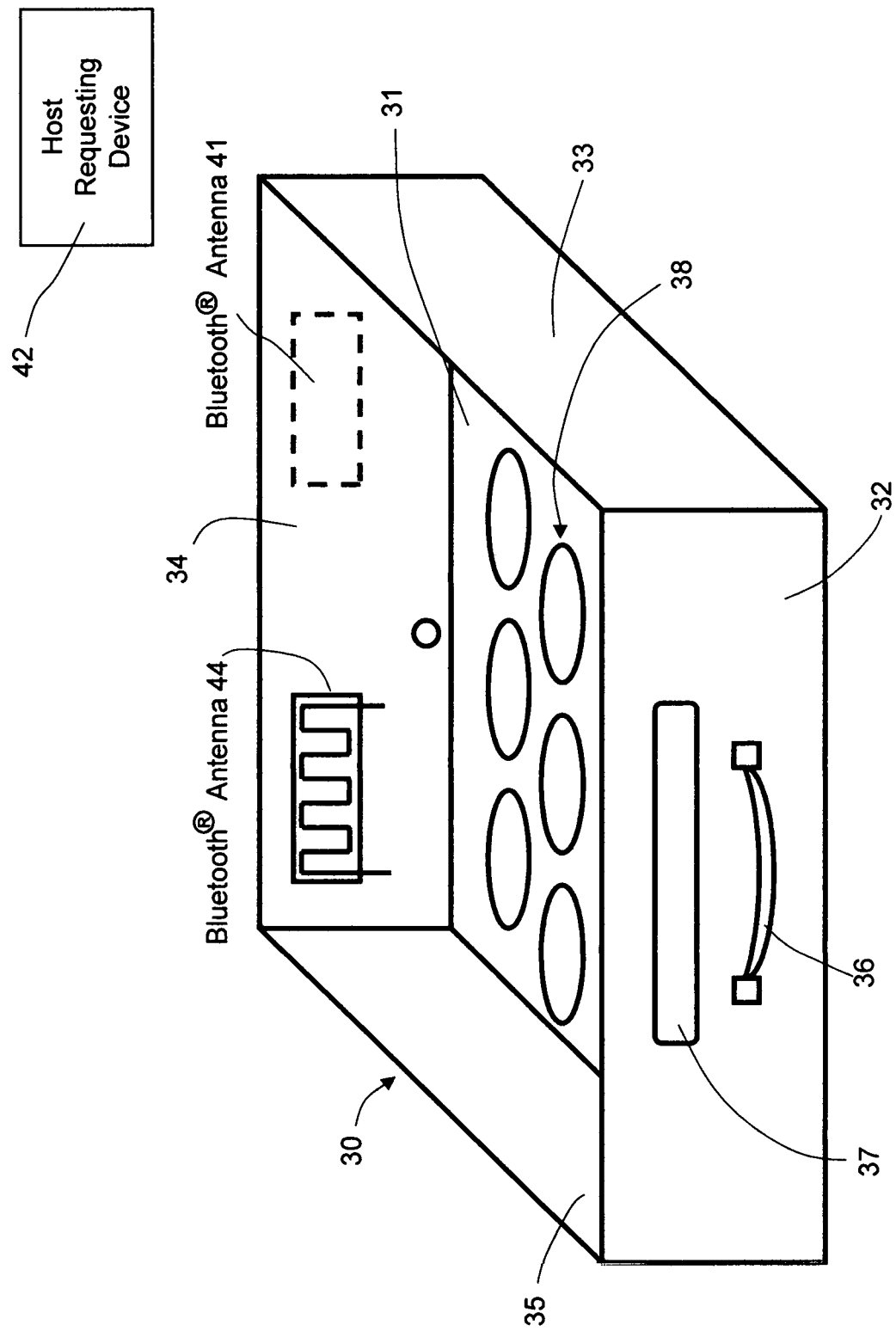
FIG. 3 is a schematic perspective view of a receptacle for the object tracking device of FIGS. 1 and 2.
Figure 4:
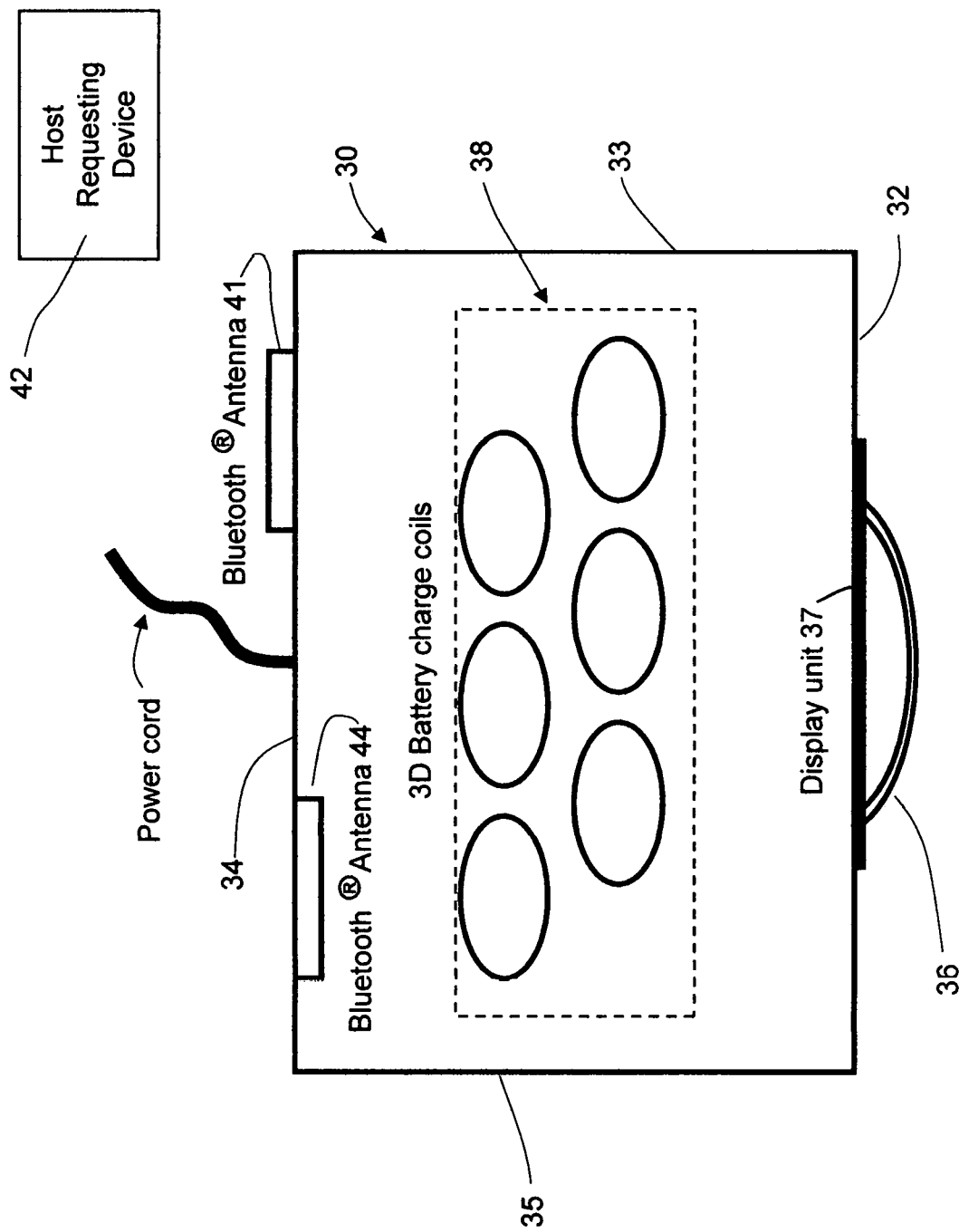
FIG. 4 is a top plan view of the receptacle of FIG. 3.

FIG. 3 is a schematic perspective view of a receptacle for the object tracking device of FIGS. 1 and 2. FIG. 4 is a top plan view of the receptacle of FIG. 3. As seen in these Figs., receptacle 30 is a box-like structure-preferably a slidable drawer-having a bottom wall 31, and four upstanding side walls 32-35. Front wall 32 is provided with a handle 36 and a display 37 described more fully below with reference to FIG. 8. The purpose of display 37 is to provide a visible indication of the identity of an object tracking device being sought and which is located inside receptacle 30. Secured to the upper surface of bottom wall 31 is a wireless charger antenna array generally designated with reference numeral 38, which generates an electromagnetic field within the interior of receptacle 30 that supplies power to the wireless charger antenna 27 of each object tracking device located within receptacle 30. The structure and function of antenna array 38 is described more fully below with reference to FIG. 7.

Attached to the outer surface of back wall 34 of receptacle 30 is a first Bluetooth® antenna 41 which is capable of bidirectional wireless communication with an external host requesting device 42. Host requesting device 42 may comprise any one of several types of units configured to provide Bluetooth® communication with another device having this same communication capability. Examples of host requesting devices are lap top computers, tablets, and smart phones. Attached to the inner surface of back wall 34 is a second Bluetooth® antenna 44 which is capable of bidirectional wireless communication with the electronic devices described below which are located within receptacle 30.

Figure 5:
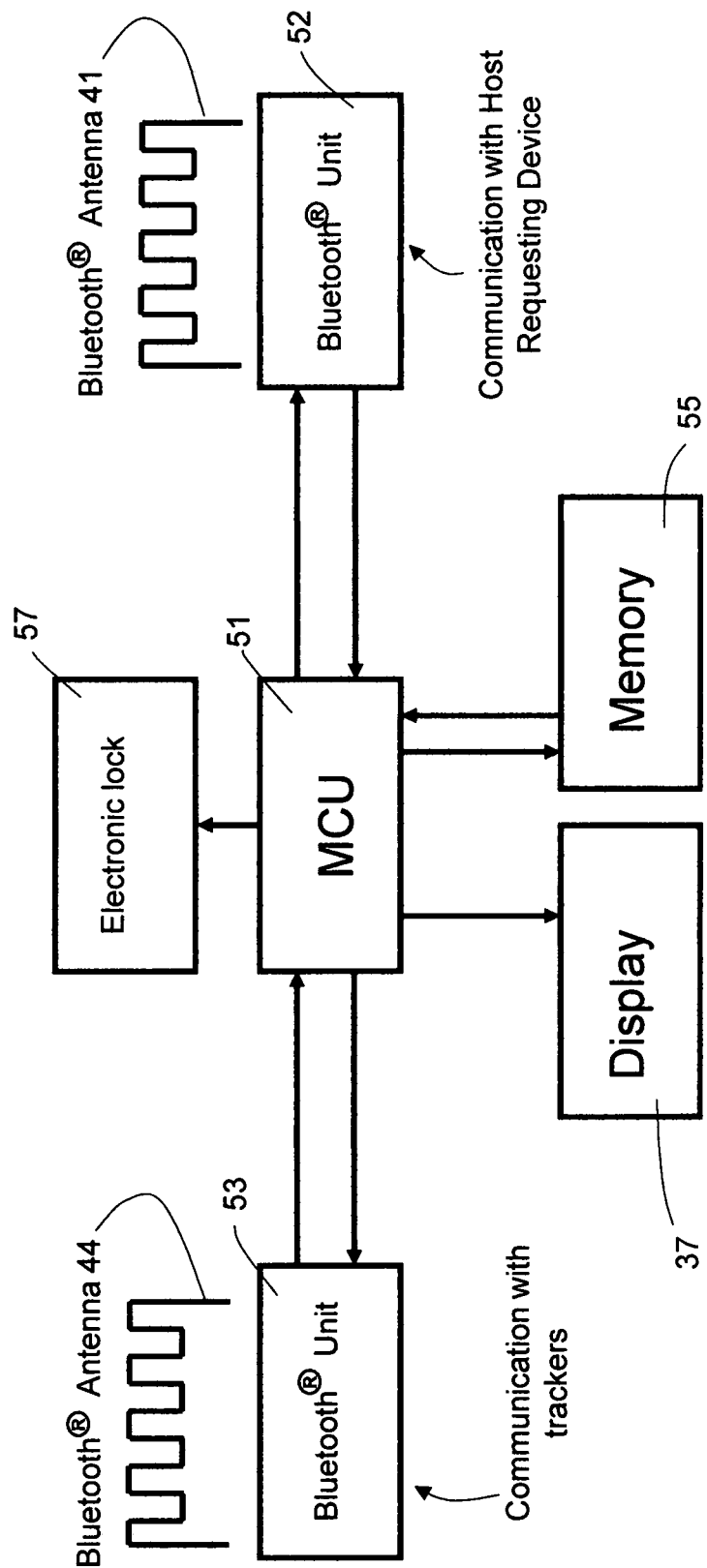
FIG. 5 is a schematic block diagram of the principal electronic components of the receptacle of FIGS. 3 and 4.

FIG. 5 is a schematic block diagram of the principal electronic components of the receptacle of FIGS. 3 and 4. As seen in this Fig., a microcontroller 51 (hereinafter MCU 51) is configured to provide supervisory control over the remaining components shown in this Fig. MCU 51 preferably comprises a type LPC1766 unit available from NXP Semiconductors of Eindhoven, the Netherlands. Coupled to MCU 51 for bidirectional communication is a first Bluetooth® unit 52 which provides communication between Bluetooth® antenna 41 and MCU 51. Also coupled to MCU 51 for bidirectional communication is a second Bluetooth® unit 53 which provides communication between Bluetooth® antenna 44 and MCU 51 and with the object tracking devices located in receptacle 30. Both units 52 and 53 are preferably a type BLE 133-A-V1 unit available from Silicon Labs of San Jose, Calif. MCU 51 is also coupled to display unit 37 and is configured to provide object tracking device identification information to display unit 37 when incoming information signals sensed by antenna 41 are determined to specify an object tracking device which is present in receptacle 30. MCU 51 is further coupled for bidirectional communication with a receptacle memory unit 55, which stores identity information of all object tracking devices 10 present in receptacle 30. MCU 51 is configured to periodically scan the contents of receptacle 30 and store the results of a given scan in memory unit 55. A new scan is compared with the current list of object tracking devices 10 stored in memory unit 55. If there are differences signifying that one or more object tracking devices 10 have been added or removed from receptacle 30, the list in memory unit 55 is updated to specify the current contents of receptacle 30. Memory unit 55 is preferably a type AT24c02 unit available from Atmel Corporation of San Jose, Calif. MCU 51 is also coupled to a normally latched electronic lock 57 which, when activated by MCU 51, unlocks receptacle 30 in its enclosure, such as the cabinet depicted in FIG. 9, so that receptacle 30 can be manually opened.

Figure 6:
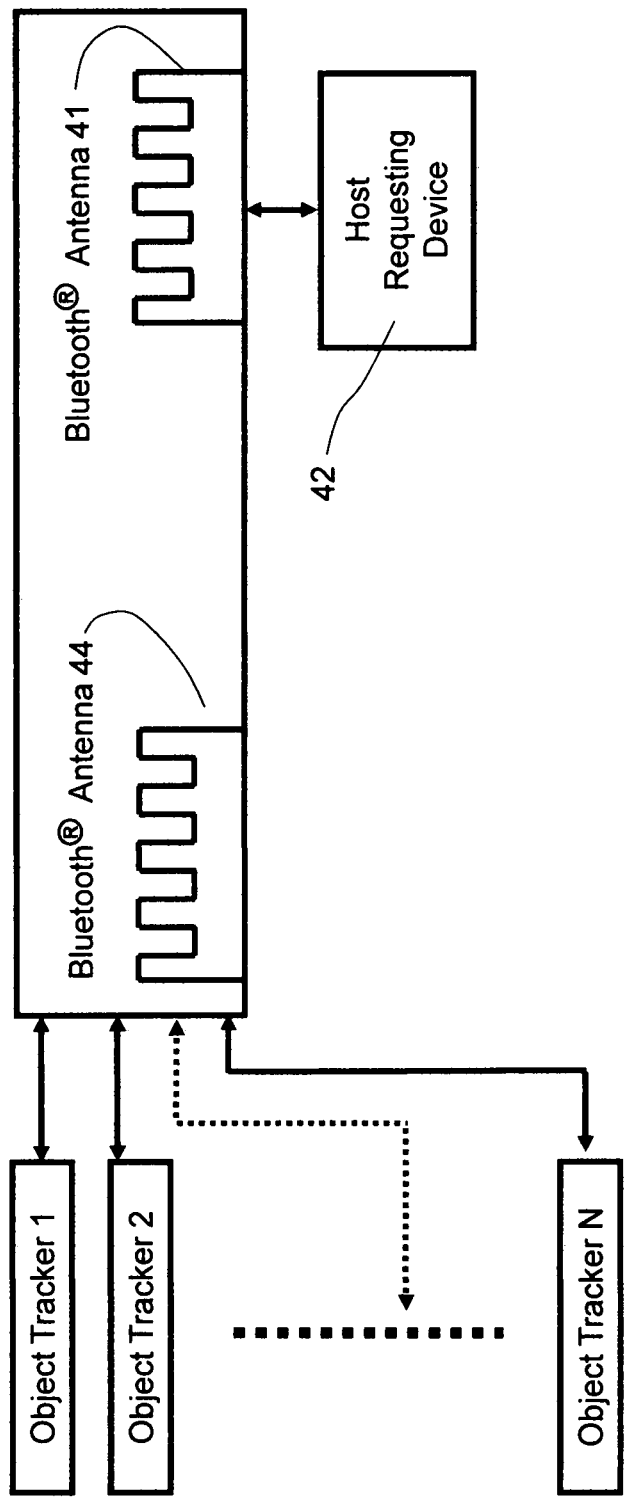
FIG. 6 is a schematic conceptual view illustrating the interplay between several object tracking devices in a receptacle, the two Bluetooth® antennae, and the external requesting unit.

FIG. 6 is a schematic conceptual view illustrating the interplay between several object tracking devices in a receptacle 30, the two Bluetooth® antennae 41, 44, and the external requesting unit 42 Incoming information signals from the host requesting device 42 are sensed by antenna 41 and passed on to MCU 51 (not shown). MCU 51 processes these signals and conveys the processed results to antenna 44. Antenna 44 broadcasts these results to all object tracking devices present within receptacle 30. One of the object tracking devices will recognize its identification in the signals it received from antenna 44 and will generate a response signal which can be sensed by antenna 44. This response signal will then be conveyed to MCU 51 for further processing.

Figure 7:
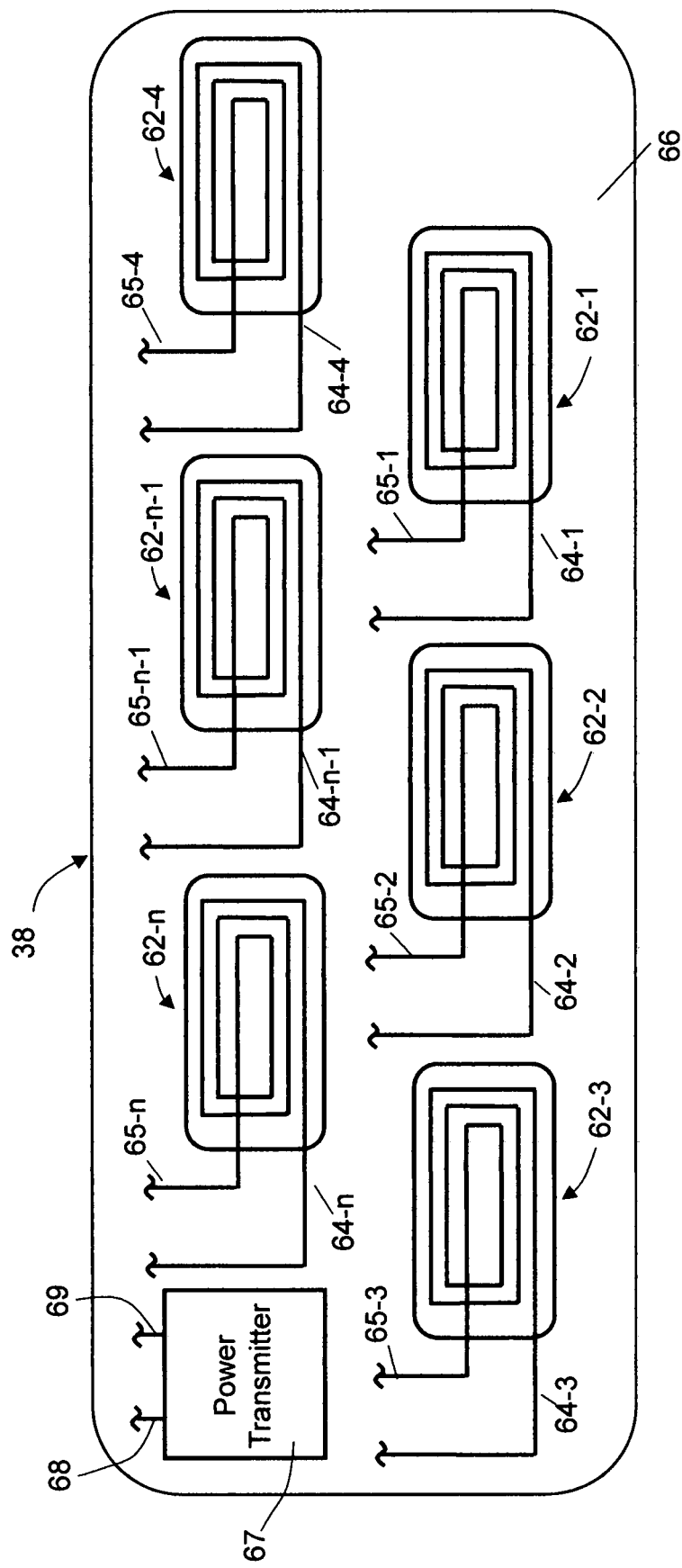
FIG. 7 is a plan view taken from above of the transmitting antenna array for supplying externally generated electrical power to the individual battery management components of the object tracking devices.

FIG. 7 is a plan view taken from above of the transmitting antenna array 38 for supplying externally generated electrical power to the individual battery management components 25-27 of the object tracking devices 10. As seen in this Fig., transmitting array 38 comprises a plurality of individual multi-turn essentially planar coils 62-1, 62-2, . . . , 62-$n$ each having a pair of terminals 64-1, 64-2, . . . , 64-$n$; 65-1, 65-2, . . . , 65-$n$ coupled to an associated transmitter unit 67. Transmitter unit 67 generates a sinusoidal signal on a pair of output terminals 68, 69 which is coupled to the terminals of the individual coils. Transmitting antenna array 38 is secured to a substrate 66, which provides a support structure for mounting transmitting antenna array 38 to the upper surface of bottom wall 31 in a receptacle 30. Substrate 66 may be fabricated from any suitable material, such as sheet fiberglass material used in the fabrication of printed circuits. Coils 62-1, 62-2, . . . , 62-$n$ can be formed using standard etching techniques which are well known in the art of printed circuit board manufacture. All coils 62-1, 62-2, . . . , 62-$n$ have substantially the same length and width and the same number of turns so that their physical dimensions are the same. After forming coils 62-1, 62-2, . . . , 62-$n$, transmitting antenna array 38 can be installed on the upper surface of bottom wall 31 of a receptacle 30 by applying a suitable adhesive to the coil side of substrate 66 and adhering the coil side to the upper surface of the bottom wall 31. By mounting the transmitting antenna array 38 with the coil sides down, the back surface of substrate 66 is the surface which makes contact with any article deposited in the receptacle 30, which eliminates wear and tear on the coils 62-1, 62-2, . . . , 62-$n$. The length and width dimensions of transmitting antenna array 38 are selected to match the dimensions of the inner perimeter of the receptacle 30 so that the length of transmitting antenna array 38 spans the width of a receptacle 30 and the width of transmitting antenna array 38 spans the depth of the receptacle 30. As will be apparent to one of ordinary skill in the art, the number of coils 62-1, 62-2, . . . , 62-$n$ will depend upon the individual coil dimensions and the length and depth dimensions of the receptacle 30. It is noted that coils 62-I may have other geometrical configurations than the rectangular configuration with rounded corners depicted in FIG. 7. For example, elliptical and square coils may be used, if desired.

Critical to the proper operation of the embodiment shown in FIGS. 3, 4 and 7 is the relative spacing of coils 62-1, 62-2, . . . , 62-$n$. In general, the coils 62-1, 62-2, . . . , 62-$n$ must be arranged in the staggered manner depicted in FIG. 7 so that the wireless charger receiver antennas 27 of the individual object tracking devices within the receptacle 30 are always in a position to receive wireless charger receiver signals of sufficient strength to enable wireless charger chip 26 to pass on sufficient electrical energy to the battery charge chip 25. In the preferred configuration shown, the lateral spacing between adjacent coils 62-1, 62-2, . . . , 62-$n$ in a given row of coils is equal to ½ the length of an individual coil, while the coils in adjacent rows are offset by ¼ the length of an individual coil. This configuration ensures that a receiver antenna 27 placed over the null region near the geometric center of a transmitting coil always lies within the range of another transmitting coil. It is noted that transmitting array 38 is always powered up to provide electromagnetic energy to any object tracking devices 10 located in receptacle 30. For further information regarding the structure and function of transmitting antenna array 38 reference should be had to commonly assigned U.S. Pat. No. 9,884,507 issued Feb. 6, 2018, the disclosure of which is hereby incorporated by reference.

Figure 8:
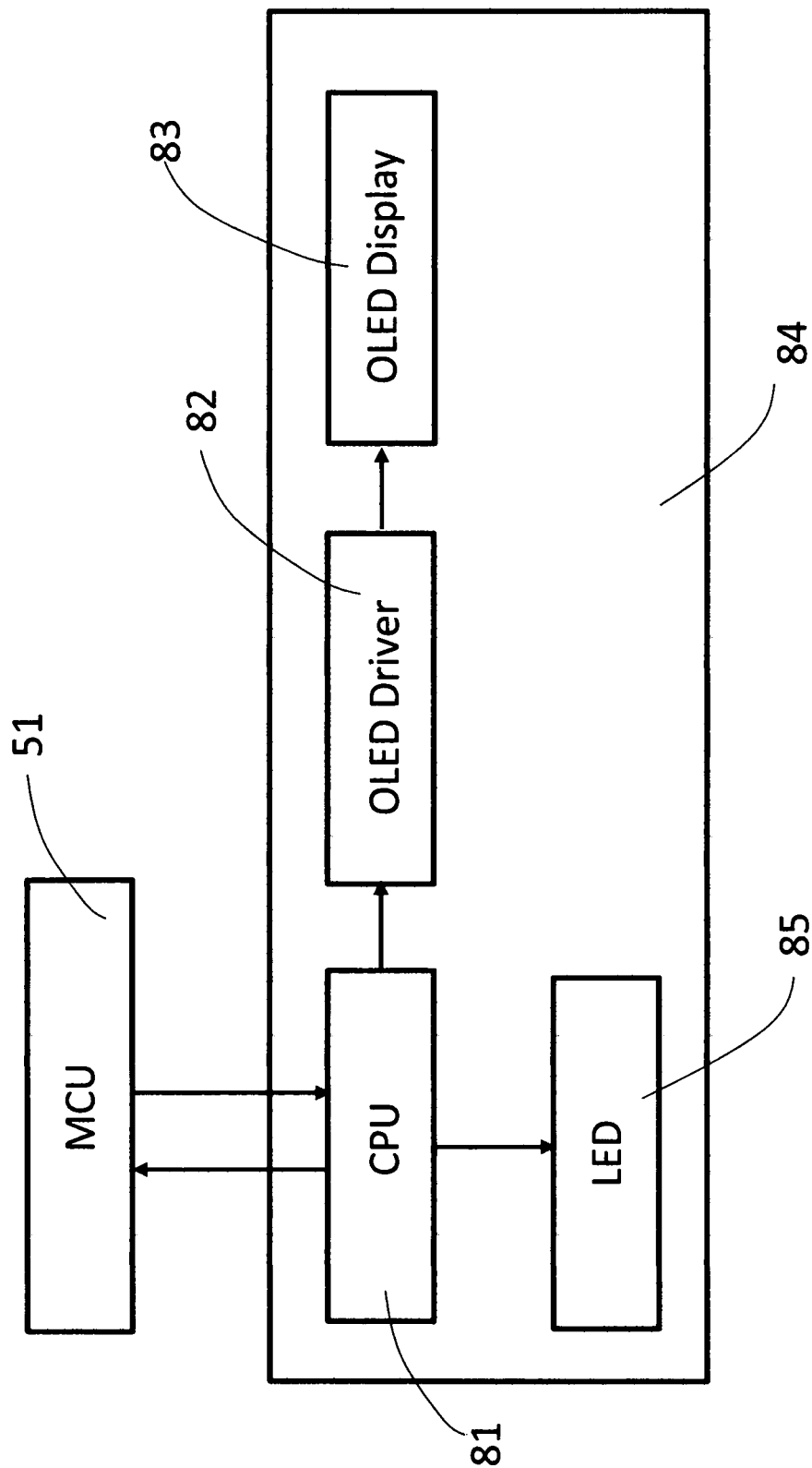
FIG. 8 is block diagram illustrating the major electronic components comprising the display unit.

FIG. 8 is a block diagram illustrating the major electronic components comprising the display unit 37. As seen in this Fig., these major components include a CPU 81, an OLED driver 82, and an OLED display 23, which are all mounted on a circuit board 84, and an LED 85 mounted on the front wall 32 of receptacle 30. OLED driver 82 is preferably a type SSD 1305 driver unit available from Solomon Systech of Hong Kong and functions to convert display information instruction signals from CPU 81 to display driver signals for display 23. CPU 81 is preferably a type PIC16F1823 unit available from Microchip Technology, Inc. of Chandler, Ariz. and has several functions. First, CPU 81 receives receptacle address signals from MCU 51 and compares these signals with the receptacle address stored in a memory portion of CPU 81. If there is a match between the receptacle address signals and the stored receptacle address, CPU 81 sends a match signal to MCU 51, which in turn informs the host requesting device 42 that the correct receptacle has been located. In response, the host requesting device 42 sends display information to MCU 51, which conveys this information to CPU 81. CPU 81, in turn, furnishes this display information to OLED driver 82, which applies the correct drive signals to OLED display 83, thereby causing the information to be visibly displayed. In addition, CPU 81 causes LED 85 to be activated so that the correct drawer can be visually located and opened. For further information regarding the structure and function of display unit 37 reference should be had to commonly assigned U.S. Pat. No. 9,595,241 issued Mar. 14, 2917, the disclosure of which is hereby incorporated by reference.

Figure 9:
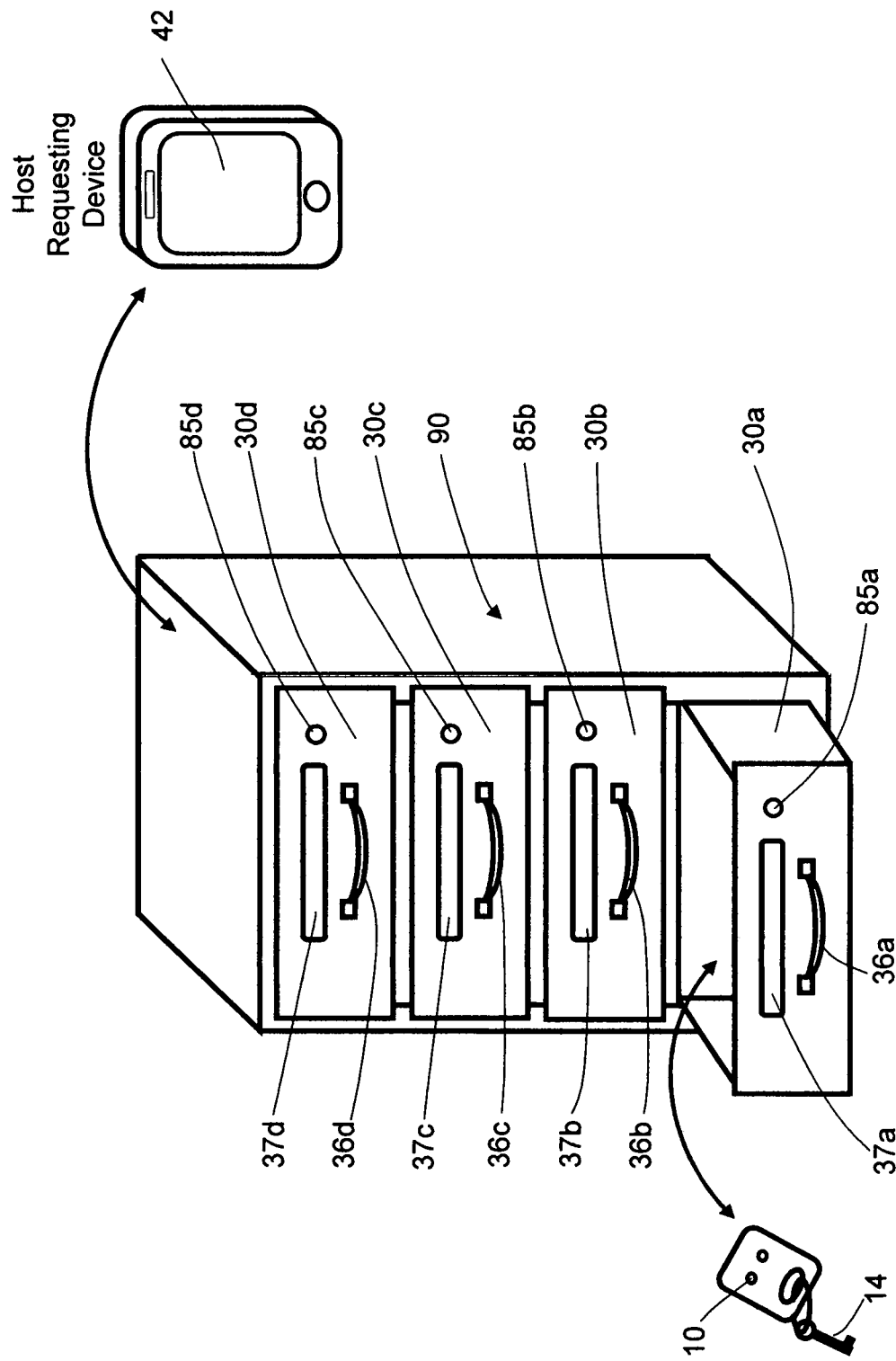
FIG. 9 is a perspective view illustrating a system configuration of one multi-drawer cabinet and a single requesting device.

FIG. 9 is a perspective view illustrating a system configuration of one multi-drawer cabinet 90 and a single requesting device 42. AS seen in this Fig., Cabinet 90 has four cavities for slidably receiving individual drawer receptacles 30$a$, 30$b$, 30$c$, and 30$d$, each of identical construction and having identical electrical components to those described above. In addition to drawer handles 36$a$-36$d$ and displays 37$a$-37$d$, each drawer receptacle is provided with an LED light source 85$a$-85$d$ which is activatable by MCU 51.

In operation, to initialize the system, host requesting device 42 generates a system scan signal which is broadcast to all cabinets 90 in the system. Each MCU 51 responds by generating a receptacle identification signal which is broadcast back to host requesting device 42. Upon receipt of these receptacle identification signals, host requesting device 42 stores a list of all receptacles 30 present in the system. To store an object tracking device 10 and object 14 in a receptacle 30, host requesting device 42 generates an unlock receptacle 30 signal which identifies a particular receptacle to be unlocked. When the MCU 51 in that receptacle receives the Unlock receptacle signal, MCU 51 unlocks lock 57, thereby permitting the specified receptacle to be opened. In addition, MCU 51 activates the light source 85 on the receptacle front wall 32 to assist the user in finding the unlocked receptacle 30. After the object tracking device 10 and object 14 have been placed in receptacle 30, the receptacle is manually moved to the closed position and is automatically locked by lock 57. On the next periodic scan of the receptacle 30 contents by MCU 51, the identification character of the newly deposited object tracking device 10 is stored in memory unit 55 by MCU 51, and this information is transmitted to host requesting device 42 thereafter. Failure to move the opened receptacle 30 to the closed position can also be detected by MCU 51 by using a suitable receptacle position sensor-such as a receptacle position limit switch-and this information can be used to operate a local alarm or to inform the host requesting device 42 of this undesirable condition. Host requesting device 42 can use this information to alert security personnel to take appropriate action.

Information correlating a given object tracking device 10 with the attached object 14 is manually entered into the host requesting device 42 by an authorized user of the host requesting device 42. For an object such as an automobile key, this information may include the year, make, model, VIN number and license plate number of the automobile. For an object 14 such as a hotel room key, this information may simply be the room number. Other types of information may apply to other types of objects.

To retrieve an object 14 from a receptacle 30, the host requesting device 42 broadcasts specific information identifying the object tracking device 10 and the receptacle 30 identification. When this information is received by the MCU 51 in the specified receptacle 30, MCU 51 unlocks the lock 57, illuminates the light source 85, and activates the specified object tracking device 10. When activated, the specified object tracking device 10 activates the LED associated to aperture 17 in the object tracking device 10. In response, the LED flashes to provide a visible indication that the object tracking device 10 is the one being sought. The user may then remove the object tracking device 10 and attached object 14 and move the receptacle 30 to the closed and locked position. On the next receptacle scan, MCU 51 will note the removal and store this information in memory unit 55. On the next communication with host requesting device 42, this change will be transmitted to the host requesting device 42, which will then update the master list of object tracking devices 10. The return of a previously removed object tracking device 10 and object 14 is essentially the same as the removal process.

Although the above description is devoted to an implementation of the invention in the field of key management systems, the invention has much wider application. In general, the invention can be used in any collective object management system in which the need exists for a technique for rapidly identifying a given class or type of object from a collection of objects which are designed to be randomly deposited in receptacles 30 of the type shown and described above. For example, in a retail store operation, the objects may be individual merchantable items (such as dry cell batteries, hardware items, or the like) carried by a packaging unit designed to be removably attached to an object tracking device and provided with identifying information for the item. In any application, the object tracking device 10 associated to a specific object is closely coupled to the object itself.

Although the above provides a full and complete disclosure of the preferred embodiments of the invention, various modifications, alternate constructions and equivalents will occur to those skilled in the art. For example, while the invention has been described with reference to specific microcontroller devices, other comparable devices may be employed, depending on the preferences of the system designer. Further, the invention may be used to manage an object management system of many object cabinets positioned at different physical locations using an internal or an external wireless network, if desired. Therefore, the above should not be construed as limiting the invention, which is defined by the appended claims.

What is claimed is:

1. A receptacle for removably containing addressable object tracking devices attached to objects and having a battery and battery management components, said receptacle comprising:
   a structure having a bottom wall, an upstanding front wall, an upstanding rear wall and two opposed upstanding side walls forming an enclosure open at the top thereof;
   a first Bluetooth antenna secured to an outside surface of one of said walls;
   a second Bluetooth antenna secured to an inside surface of one of said walls;
   an MCU positioned within said enclosure;
   a first Bluetooth® unit coupled between said first Bluetooth® antenna and said MCU for providing bidirectional communication therebetween;
   a second Bluetooth® unit coupled between said second Bluetooth® antenna and said MCU for providing bidirectional communication therebetween; and
   a transmitting antenna array for supplying externally generated electrical power to the battery management components of object tracking devices located in said enclosure.

2. The receptacle of claim 1 wherein said first and second Bluetooth® antenna are secured to the same wall of said receptacle.

3. The receptacle of claim 2 wherein said same wall is the rear wall of said receptacle.

4. The receptacle of claim 1 further including an electronic lock coupled to said MCU and controllable thereby to provide a releasable locking function for said receptacle.

5. The receptacle of claim 1 further including a light source attached to said front wall of said receptacle, said light source being coupled to said MCU and controllable thereby to provide a visible indication of the state of said receptacle.

6. The receptacle of claim 1 further including a memory unit coupled to said MCU for storing information indicative of the contents of said receptacle.

7. The receptacle of claim 6 wherein said information includes the identification of any object tracking devices located in said enclosure.

8. The receptacle of claim 1 wherein said transmitting antenna array comprises a support surface and a plurality of multi-turn essentially planar coils carried by said support surface and arranged in a mutually spaced array of at least two rows with coils in one row laterally spaced with respect to coils in another row.

9. The receptacle of claim 8 wherein each coil has a length dimension; wherein the coils in a given row are mutually spaced by an amount substantially equal to one-half said length dimension; and wherein the coils in one row are laterally spaced with respect to the coils in another row by an amount substantially equal to one-fourth said length dimension.

10. A system for managing objects distributed in an object location space, said objects being attached to addressable object tracking devices having a battery and battery management components said system comprising:
- a cabinet having at least one cavity for slidably receiving drawer-like receptacles; and
- at least one receptacle slidably received in said at least one cavity for removably containing said addressable object tracking devices, said receptacle comprising:
- a structure having a bottom wall, an upstanding front wall, an upstanding rear wall and two opposed upstanding side walls forming an enclosure open at the top thereof;
- a first Bluetooth® antenna secured to an outside surface of one of said walls;
- a second Bluetooth antenna secured to an inside surface of one of said walls;
- an MCU positioned within said enclosure;
- a first Bluetooth® unit coupled between said first Bluetooth® antenna and said MCU for providing bidirectional communication therebetween;
- a second Bluetooth® unit coupled between said second Bluetooth® antenna and said MCU for providing bidirectional communication therebetween; and
- a transmitting antenna array for supplying externally generated electrical power to the battery management components of object tracking devices located in said enclosure.

11. The system of claim 10 wherein said first and second Bluetooth® antennas are secured to the same wall of said receptacle.

12. The system of claim 11 wherein said same wall is the rear wall of said receptacle.

13. The system of claim 10 further including an electronic lock coupled to said MCU and controllable thereby to provide a releasable locking function for said receptacle.

14. The system of claim 10 further including a light source attached to said front wall of said receptacle, said light source being coupled to said MCU and controllable thereby to provide a visible indication of the state of said receptacle.

15. The system of claim 10 further including a memory unit coupled to said MCU for storing information indicative of the contents of said receptacle.

16. The system of claim 15 wherein said information includes the identification of any object tracking devices located in said enclosure.

17. The system of claim 10 wherein said transmitting antenna array comprises a support surface and a plurality of multi-turn essentially planar coils carried by said support surface and arranged in a mutually spaced array of at least two rows with coils in one row laterally spaced with respect to coils in another row.

18. The system of claim 17 wherein each coil has a length dimension; wherein the coils in a given row are mutually spaced by an amount substantially equal to one-half said length dimension; and wherein the coils in one row are laterally spaced with respect to the coils in another row by an amount substantially equal to one-fourth said length dimension.

19. The system of claim 10 wherein said cabinet includes a plurality of cavities; and wherein a corresponding plurality of said receptacles are each slidably received in a different one of said plurality of cavities.

* * * * *